(No Model.)

W. H. BERGER.
FASTENER FOR WATER CONDUCTORS.

No. 425,852. Patented Apr. 15, 1890.

Witnesses:

Inventor:

UNITED STATES PATENT OFFICE.

WILLIAM H. BERGER, OF PHILADELPHIA, PENNSYLVANIA.

FASTENER FOR WATER-CONDUCTORS.

SPECIFICATION forming part of Letters Patent No. 425,852, dated April 15, 1890.

Application filed December 31, 1889. Serial No. 335,503. (No model.)

*To all whom it may concern:*

Be it known that I, WILLIAM H. BERGER, a citizen of the United States, residing at Philadelphia, in the county of Philadelphia and State of Pennsylvania, have invented certain new and useful Improvements in Fasteners for Water-Conductors; and I do hereby declare the following to be a full, clear, and exact description of the invention, reference being had to the accompanying drawings, which form part of this specification.

This invention has relation to adjustable fasteners for spouts or water-conductors, and has for its object the provision of certain improvements in that type of fastener shown and described in Letters Patent of the United States granted August 14, 1876, No. 181,133.

The invention consists in the novel construction and combination of parts hereinafter described and claimed.

The fastener shown in the patent referred to comprises a continuous rectangular base-plate, upon which is cast a rack having ratchet-teeth with which the drive engages at different points of adjustment, a wedge-shaped key being employed to lock the two parts together. Such a fastener is difficult to shape and apply to round or corrugated pipes of various sizes, and must be soldered all around to prevent rusting between the plate and pipe. Again, the saw-shaped or ratchet teeth of the rack will not securely hold the head of the drive, but have a tendency to slip away from the lug in the drive, while the dovetail form of the rack in cross-section requires such a large opening in the head of the drive which embraces the rack that the sides of the opening are closed in driving the tangs into the wall, and the parts cannot afterward be detached from each other when repairs are required.

My present invention contemplates the provision of a rack with four arms or lugs—two at each end—pierced for the reception of rivets or other fastenings. These arms or lugs may be shaped to fit different sizes or forms of pipe, and when fastened serve to hold the rack away from the pipe, thus preventing rusting and allowing the water running down the pipe a free passage without crossing over to the wall. The teeth of the rack are of the ordinary cog or gear wheel shape, uniform in width and thickness, and hence rest level on the lug of the tang without any tendency to slip off. Such teeth require only a small opening in the tang or drive, and afford other advantages, which will be explained.

Figure 1:
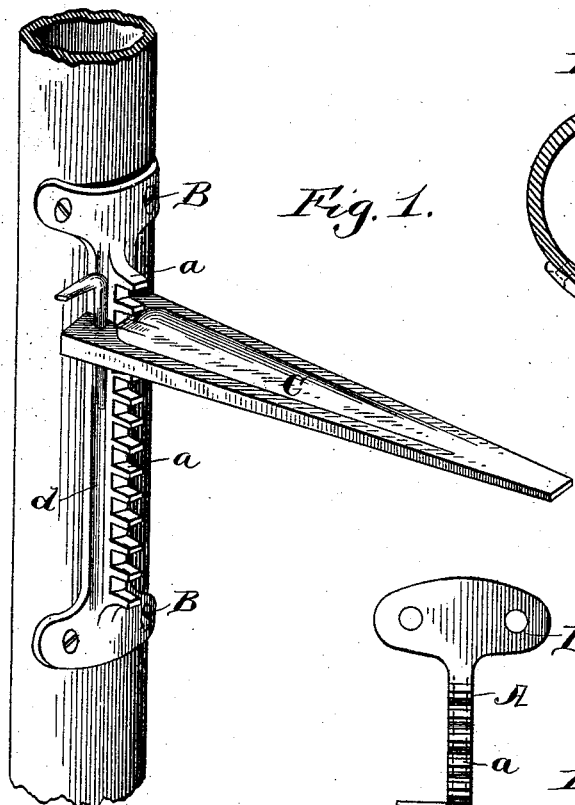
Figure 5:
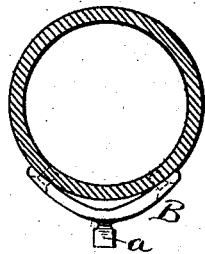
Figure 2:
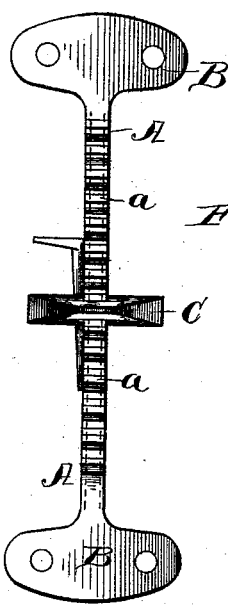
Figure 3:
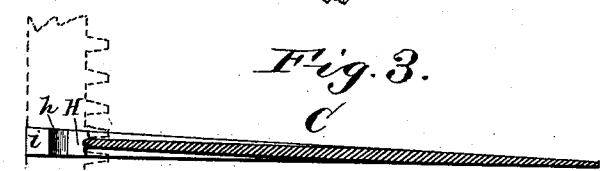
Figure 4:
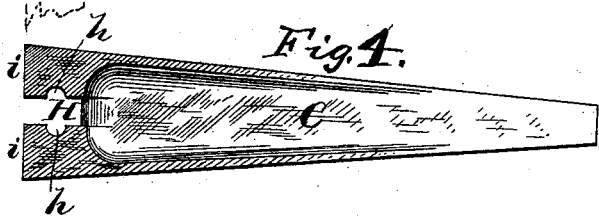

Referring to the accompanying drawings, Figure 1 is a perspective view of the fastener complete. Fig. 2 is a front view of the same. Fig. 3 is a longitudinal vertical section of the drive. Fig. 4 is a plan view of the drive. Fig. 5 is a horizontal section of the rack-bar applied to a conductor.

A designates the rack, which consists of a bar of metal having its outer edge formed with the teeth $a$, of uniform width and thickness—that is, of the form and proportion usual in gear-wheels. The sides of the bar are parallel, and are grooved lengthwise on either side, as shown at $d$, for the reception of the fastening piece or key, which can be introduced on either side.

B B are the ears, lugs, or arms projecting laterally from the ends of the rack, and canted or bent so as to conform to the shape of the spout and elevate the rack from the surface of the latter.

C designates the tang or drive, which has the general form of a spike or wedge, so that it may be driven into a wall or other support. The drive tapers in both directions, both its sides and edges being convergent.

In the head of the drive—that is, the larger end—is formed a kerf or notch H, of sufficient width to easily admit the rack-bar, and of a length sufficient to bring the head of the drive, when fastened, about flush with the back of the rack-bar. On either side of the kerf are formed the recesses $h$ $h$ for the passage of the key. When the drive and rack are first brought together, the recesses $h$ $h$ are slightly in advance of the groove; but when the drive is in place these recesses correspond with the groove in the sides of the rack, the driving in of the key serving to draw the parts toward each other, and together form an opening through which the key passes and interlocks the rack-bar and drive. The part of the drive constituting the back part of the kerf is diminished in thickness, so as to lie between two of the teeth of the rack, in which position it rests snugly, and by reason of the shape of the teeth has a bearing on them without tendency to slippage or displacement. This construction produces the lugs $i\ i$ on either side of the head of the drive, which abut against the sides of the rack, and assist in holding the rack and tang in correct alignment. The flat sides of the tang or drive may thus be reduced in thickness to a web, allowing the teeth of the rack to be formed close enough together to admit a fine adjustment and providing a channel for the flow of the water from the end of the tang instead of over the side. The channeling of the tang also gives the device a better purchase in fastening, as the channel retains the mortar when the tang is driven into a wall.

Having described my invention, what I claim, and desire to secure by Letters Patent, is—

1. In a fastener for water-conductors, a rack having fastening-arms located at each end to embrace a pipe, said arms being canted so as to elevate the rack from the pipe, substantially as described.

2. In a fastener for water-conductors, a drive with open slot or kerf having parallel sides terminating in a cog-tooth at the end to embrace a rack with similar teeth, substantially as described.

3. In a fastener for water-conductors, a drive having an open slot with straight sides, the latter being recessed for the passage of a key adapted to draw the drive and its rack toward each other and interlock the two, substantially as described.

4. In a fastener for water-conductors, the combination, with a rack having parallel sides, of a drive C, consisting of a tapered bar having a notch H in its larger end, the sides of said notch being re-enforced on their upper and lower sides so as to form a square socket to receive the rack and preserve its proper relation to the drive, substantially as described.

5. In a fastener for water-conductors, a drive channeled out from the tooth toward the point to carry off water from the wall toward the rack and out at the teeth, substantially as described.

6. In a fastener for water-conductors, a toothed straight-sided and grooved rack adapted to be embraced at each side, in combination with a slotted channeled and toothed drive adapted to be embraced below and above, substantially as described.

7. In a fastener for water-conductors, the combination, with a rack A, having grooved sides $d$, and a drive C, having a notch H in its larger end, with its walls recessed at $h$, of a key which is adapted to enter one of said grooves $d$, and notches $h$ to lock the drive and rack-bar together, substantially as described.

In testimony that I claim the foregoing I have hereunto set my hand this 9th day of December, 1889.

WILLIAM H. BERGER.

Witnesses:
C. B. ROBERTS,
FRANK L. LYLE.